UNITED STATES PATENT OFFICE.

FREEMAN SCOTT MOON, OF LOS ANGELES, CALIFORNIA, ASSIGNOR TO INTERNATIONAL PRECIPITATION COMPANY, OF LOS ANGELES, CALIFORNIA, A CORPORATION OF CALIFORNIA.

METHOD OF INCREASING THE SOLUBILITY OF POTASSIUM COMPOUND IN CEMENT FLUE-DUST.

1,283,261.  Specification of Letters Patent.  Patented Oct. 29, 1918.

No Drawing.  Application filed October 3, 1917.  Serial No. 194,510.

*To all whom it may concern:*

Be it known that I, FREEMAN SCOTT MOON, a citizen of the United States, residing at Los Angeles, in the county of Los Angeles and State of California, have invented a new and useful Method of Increasing the Solubility of Potassium Compound in Cement Flue-Dust, of which the following is a specification.

The object of this invention is to increase the solubility of potassium compound present in cement kiln flue dust and constituting a valuable by-product of Portland cement manufacture. In many cases, particularly where coal is used as fuel, in the cement kilns, the flue dust contains a considerable amount of potassium compound which is very difficultly soluble in water, in addition to more or less potassium compound which is water soluble and some potassium compound which is substantially insoluble. The potassium compound in the dust in fact, consists partly of the wholly insoluble potassium content of the original raw mix which is carried off in the flue gases in unvolatilized and unaltered condition; partly of soluble potassium salts such as oxid, carbonate, sulfate and chlorid, the proportions of these constituents depending on the conditions of practice, including the constitution of the raw mix and of the fuel; and partly, of potassium compound which is altered in constitution from the original rock or clay constituent, but is very difficultly soluble in water. This difficultly soluble constituent is assumed, in the case of flue dust from coal-burning kilns, to consist of material that has been volatilized and altered in constitution by the heat, but has been reconverted into the form of silicate by contact while still hot, with silicious material present in the flue gases and derived from the ash of the coal used as fuel. Where substantially ashless fuel is used—for example, petroleum, the proportion of this difficultly soluble constituent is relatively small, and the production of this difficultly soluble volatilized potassium compound appears, in fact, to be dependent on the presence of silicious material in the fuel. In view of these facts, it is considered that the difficultly soluble potassium compound present in the flue dust is a silicate, (either simple or complex). I have discovered that by heating flue dust to a suitable temperature in the absence of silicious material, there is effected a conversion of a considerable portion of this difficultly soluble potassium compound to a readily soluble potassium compound. In order to secure effective conversion in a reasonable time, it is necessary to heat the material to the neighborhood of 1000° C. and at this temperature there is considerable volatilization of potassium compound from the material. My present invention provides for recovery and utilization of this volatilized potassium compound, as well as increased production of a relatively soluble potassium compound in the unvolatilized residue.

The method of constituting this invention may be carried out as follows:

The flue dust passing from a Portland cement kiln is collected by any suitable means—for example, by electrical precipitation, according to the Cottrell process, and heated in a suitable furnace, preferably in a furnace of the muffle-fired type in which the products of combustion do not come in direct contact with the material being heated and the material is thereby brought to a temperature of about 1000° C. (not less than 700° C. or more than 1200° C.) and is maintained at that temperature for from fifteen minutes to two hours. In this operation, from ten to eighteen per cent. of potassium compound originally present in the material, is volatilized. The portion so volatilized is preferably collected by electrical precipitation, the gases from the heating furnace—for example, being conducted to the electrical precipitator for collecting the fume from the cement kiln, or to a separate precipitator. The unvolatilized residue is removed from the furnace and may be sold on a basis of its "soluble potash" content, or it may be leached with water, either cold or hot, to extract the soluble potassium compound which may be then crystallized out by evaporation and cooling, or, if desired, the solution may be evaporated to dryness and the resulting solid material containing potassium salts and other soluble salts, may be sold as a crude potassium-bearing product. I prefer to allow the calcined material to cool in air before leaching, rather than to quench it in water, as a higher percentage of soluble potassium compound is thereby obtained.

As an illustration of my process, cement kiln flue dust, electrically precipitated, and containing 6.48 per cent. of potassium compound calculated at $K_2O$, of which 1.76 per cent. was water soluble (27.2 per cent. of the total potash) at ordinary temperature, was heated to 1000° C. for the following periods of time, with the result that the percentage of soluble to total potash was increased as indicated—namely, 10 minutes 37.3 per cent.; 20 minutes, 60.4 per cent.; 40 minutes, 69.9 per cent.; 60 minutes, 75.1 per cent.; 120 minutes, 76.7 per cent. The amount of potassium compound volatilized in sixty minutes was 14.9 per cent., and in 120 minutes 18.5 per cent. (calculated as $K_2O$).

As the potassium compound in the original cement raw mix is not volatile to any substantial extent below 1200° C., it is evident that the difficultly soluble potassium compound present in the flue dust is of a different nature to that present in the original raw mix. In this connection, an important feature of my invention is the volatilization of potassium compound from the flue dust at a temperature below 1200° C.—that is to say, below the sintering temperature that usually exists in a cement kiln, and below the temperature that potassium compound is volatilized from cement raw mix. At the temperature of 900° to 1100° C., which is preferred for carrying out this process, the cement flue dust shows incipient fusion, the stated temperature approaching, but being somewhat below the sintering temperature, so that when the dust is cooled, it is still granular or at least, porous and friable, and does not require regrinding or crushing to enable it to be effectively leached.

The main components of the flue dust are lime, silica, alumina and alkali compounds, a part of such components being present as sulfates (in some cases also as chlorids) and the conversion of the difficultly soluble potassium compounds present to relatively soluble form, may depend more or less on the presence of the other components, particularly lime.

The heat required for treatment of the flue dust, as above described, may be produced in any suitable manner—for example, by using petroleum as fuel in a reverberatory or other furnace, or by a gas fired furnace, or by an externally heated (muffle-fired) furnace. In any case, however, I prefer to apply the heat in such manner that silicious ash is not brought in contact with the potassium compound when it is at high temperature, and the formation of relatively insoluble silicates is thereby prevented, this being especially important in the case of the volatilized portion of the potassium compound.

What I claim is:

1. The method of treating cement kiln flue dust containing difficultly soluble potassium compound which consists in heating the same to a temperature approaching, but below, sintering temperature, collecting the potassium compound thereby volatilized from the flue dust and leaching out potassium compound from the residual flue dust.

2. The method of treating cement kiln flue dust for increasing the solubility of potassium compound therein, which consists in heating such flue dust to a temperature approaching but below sintering temperature, by contact with hot gases substantially free from silicious ash, and thereby volatilizing a part of the potassium compound and increasing the solubility of both volatilized and unvolatilized portions of the potassium compound.

3. The method of treating cement kiln flue dust containing difficultly soluble potassium compound, which consists in heating the same to a temperature approaching but below sintering temperature, by contact with hot gases substantially free from silicious ash, thereby volatilizing a portion of the difficultly soluble potassium compound in relatively soluble form, and collecting the potassium compound so volatilized.

In testimony whereof I have hereunto subscribed my name this 25th day of September 1917.

FREEMAN SCOTT MOON